March 5, 1968 A. CECCHINI ET AL 3,372,369
ACOUSTIC METHOD FOR MAPPING UNDERWATER TERRAIN EMPLOYING
LOW FREQUENCY CONTINUOUS ACOUSTIC WAVES
AND FIXEDLY SEPARATED TRANSDUCERS
Filed Sept. 20, 1965

INVENTORS
ANDRE CECCHINI
MICHEL HANFF
PIERRE JUHEL
BY Paul M. Craig, Jr.
ATTORNEY United States Patent Office 3,372,369
Patented Mar. 5, 1968

3,372,369
ACOUSTIC METHOD FOR MAPPING UNDERWATER TERRAIN EMPLOYING LOW FREQUENCY CONTINUOUS ACOUSTIC WAVES AND FIXEDLY SEPARATED TRANSDUCERS
Andre Cecchini, Montrouge, Michel Hanff, Brest, and Pierre Juhel, Soyaux, France, assignors to Compagnie des Compteurs, Paris, France, a corporation of France
Filed Sept. 20, 1965, Ser. No. 488,468
14 Claims. (Cl. 340—7)

ABSTRACT OF THE DISCLOSURE

An acoustic method for prospecting the surface of the sea bed which consists in producing low frequency continuous acoustic waves at a first point below the water above the bed. The acoustic waves are received continuously at at least one second point lying below the surface of the water above the bed at a predetermined constant distance above the bed and at a predetermined constant distance from the first point. The received acoustic waves are continuously recorded and measured and the continuation of the signal employed to define data relating to the nature of the sea bed.

---

The present invention relates to a method for prospecting acoustically in a continuous manner the sea bed by means of acoustic waves at a low or very low frequency and it also covers arrangements incorporating said method.

The knowledge of the nature of submarine surfaces and of the geological strata forming them is essential for numerous applications such as the execution of harbour installations, the erection of tide controlled plants, the execution of submarine tunnels, the search of petroleum carrying strata or of ores and the like. The known means based on the mechanical removal of samples are extremely expansive and provide only intermittent indications over very reduced depths of ground. Other methods resorting to echoes collected as a consequence of explosions or else to the reflection of vertically transmitted supersonic waves also show the drawback of providing only very inaccurate indications as to the nature of the surface layers of the sea bed areas to be examined.

Now, we have found that the use of acoustic waves at low frequencies or very low frequencies when transmitted and received under particular conditions allows obtaining some knowledge as to the mechanical and geological properties of the sea bottom in a much more thorough manner than when proceeding in accordance with previous methods.

Our improved prospecting method consists in producing acoustic waves at a low or very low frequency through the agency of an immersed transmitter and in receiving the waves thus transmitted through the agency of at least one receiver immersed at a constant distance from the submarine surface and a known distance from the transmitter after which the signals received are recorded and measured in a continuous manner so that it is possible to deduce through comparison the nature of the submarine surfaces which have thus been prospected.

The transmission of the acoustic waves is performed continuously throughout the duration of a prospecting operation, the amplitude of the waves thus transmitted or their level remaining constant throughout said duration or varying at the utmost very slowly.

Furthermore, the frequency of the acoustic waves used remains within a range of frequencies extending between 0.1 and 1,000 cycles. Preferably, the acoustic waves range between 5 and 30 cycles. Throughout the duration of the measuring operation, the frequency remains constant or at the utmost it varies very slightly to either side of the value serving for measuring purposes.

On the other hand, at the receiving station, the attenuation of the acoustic signals is measured or recorded; in other words, the difference in decibels between the transmitting level and the receiving level is measured or recorded.

To this end, the receiver supplies the level of the waves received while the level at the transmitting end is checked at every moment so that the attenuation is obtained by a subtraction between the values of the two levels.

Other objects and features of the invention will appear clearly upon reading of the following description associated with the accompanying drawings given by way of example and by no means in a limiting sense. In said drawings.

Figure 1:
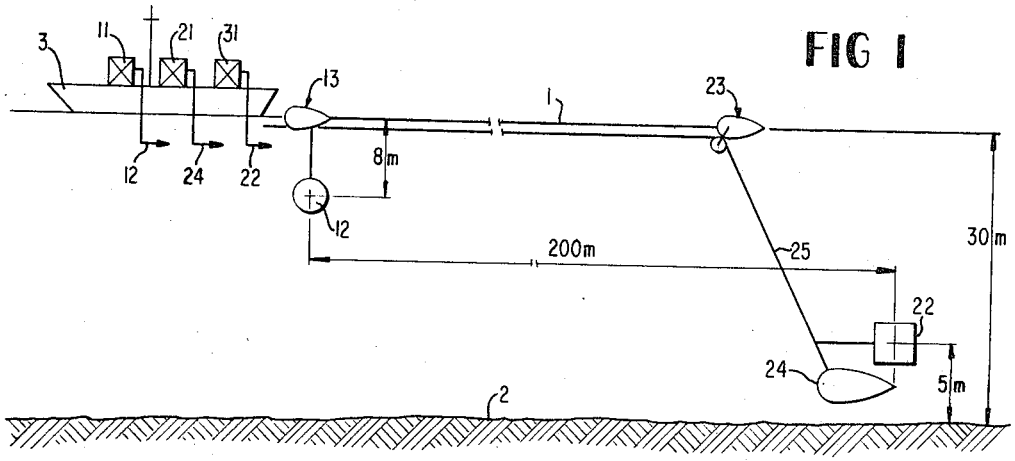
FIG. 1 is a diagrammatic illustration of an arrangement for the execution of the improved method according to the invention.

The invention relies on the discontinuities or anomalies of the propagation of acoustic waves along the sea bottom to be investigated and which it is possible to detect by reason of the suitable relative arrangement of the transmitting and receiving means, said discontinuities or anomalies being ascribable to the presence and location of geological discontinuities or anomalies in the sea bottom.

Said correspondency between acoustic and geological anomalies may be calculated in simple cases by resorting to the solution of a system of equations such as the following:

$$\nabla^2 \varphi_1 + \left[\frac{2\pi N}{V_1}\right]^2 \varphi_1 = 0$$

$$\nabla^2 \varphi_2 + \left[\frac{2\pi N}{V_2}\right]^2 \varphi_2 = 0$$

$$\nabla^2 \varphi'_2 + \left[\frac{2\pi N}{V'_2}\right]^2 \varphi'_2 = 0$$

wherein N is the frequency resorted to $\varphi_1$, $\varphi_2$, $\varphi'_2$ functions of waves having propagation speeds equal to $V_1$, $V_2$, $V'_2$ and as Laplacians respectively $\nabla^2 \varphi_1$, $\nabla^2 \varphi_2$, $\nabla^2 \varphi'_2$.

Numerical calculations of the preceding system of equations shows the very high sensitivity of the arrangement with reference to a suitable selection of the parameter N as a function of the water depth.

The execution of the method is performed as follows:

Over the sea bed to be prospected, a ship is caused to progress along a predetermined path, said ship drawing along behind her a transmitter on the one hand and the receiver or receivers, on the other hand, the geographical location of the ship being simultaneously defined by a radio locating system or any other location finding system. The transmitter is immersed at a depth which is preferably constant with reference to sea level and/or in proximity with the sea bed. The receiver or receivers which are also immersed in proximity with said bed are controlled in a manner such that their distance from the bed surface is constant and is for instance of a magnitude of about 10 meters in shallow waters. The distances separating the transmitter from each receiver are maintained at a known and constant value during operation, said distance being sufficiently large for instance of a magnitude of 250 meters and being different for the different receivers.

While the ship progresses along the path she is to follow, the intensity of the acoustic signals from the transmitter received by each of the receivers is recorded as a function of its location. Simultaneously said geographical location of the ship is recorded so that it becomes possible to establish a correspondency between the indications provided by the means measuring the intensity of the acoustic signals and by the location indicating means.

When the different parameters governing the indications obtained are known such as:

The frequency of the transmitted waves
The immersion depth of the transmitter
The distance between the transmitter and receiver
The distance between the receiver and the surface of the sea bottom it is possible to obtain an interpretation of the recorded curve through examination of the variations and discontinuities in the acoustic signals which define the mechanical properties and geological nature of the outcrops and/or of the underlying strata met along by said path.

By way of example, FIG. 1 illustrates diagrammatically an arrangement for executing the method according to the invention and including only one receiver. In said figure, 1 designates the sea level, 2 the surface to be prospected at the sea bottom, 3 the ship which draws along behind her the transmitting system 12 and receiving system 22. On board said ship, three groups of electric apparatus are provided, to wit:

An acoustic control system 11 connected with the transmitter 12 which is to be held at a constant depth of a magnitude of say 8 m. with reference to sea level as provided by a float 13 secured to the ship 3 through the agency of a cable, An arrangement 21 for controlling the immersion depth of the receiver 22 and adapted to maintain at a constant value the distance between said receiver and sea bed, which distance should be, for instance, of a magnitude of 5 meters, an embodiment of said arrangement being now described by way of example. To this end, a plunger 24 to which is secured the receiver 22 with a slight spacing therebetween, is attached through a cable of a sufficient length to a second float 23 connected with the ship 3; said plunger 24 is equipped with means for permanently measuring its distance from the sea bed and transmitting such an information to the control arrangement 21. The latter acts on the cable length connecting the float 23 with the ship, so as to maintain constant the distance of the plunger 24 and consequently of the receiver 22 with reference to the surface of the sea bed as provided by the progression imparted to said plunger by the ship. When the float 23 moves, the length of the cable 25 extending between said float 23 and the plunger 24 varies and the slope of said cable 25 with reference to a vertical line varies simultaneously. The whole arrangement is defined in a manner such that the distance between the receiver 22 and transmitter 12 remains practically constant.

Arrangements 31 for amplifying the measuring and recording data, which arrangements are connected with the receiver 22 so as to measure and record the attenuation of the acoustic signals collected by said receiver.

Figure 2:
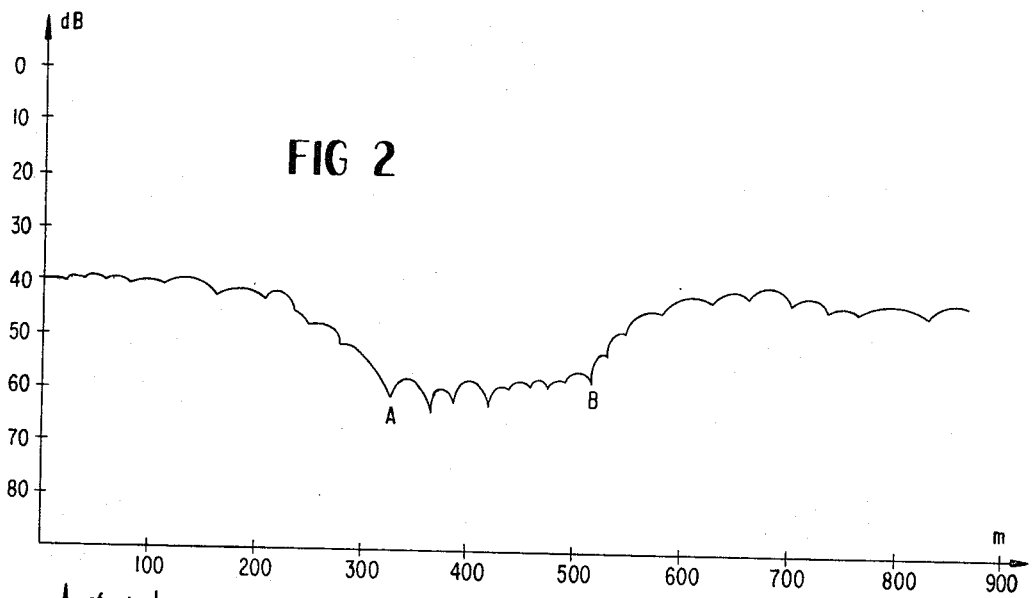
FIG. 2 shows a recorded curve obtained through the arrangement according to FIG. 1.

FIG. 2 shows by way of example a recorded curve obtained with the arrangement according to FIG. 1 as a result of the execution of the method according to the invention. The frequency of the transmitting waves was of about 20 cycles per second, while the water depth down to the sea bed was of a magnitude of 30 meters and the distance between the transmitter and receiver was equal to about 200 meters. On the curve appearing in FIG. 2, the distance in meters travelled over by the ship are shown in abscissae, while the ordinates show the attenuation in decibels of the acoustic signals received by the receiver. The location of the geographical anomaly at AB is very accurate since it has been obtained with a frequency of transmission providing large differences in acoustic attenuation for the parameters defined beforehand such as the water depth and distance between the transmitter and receiver.

Figure 3:
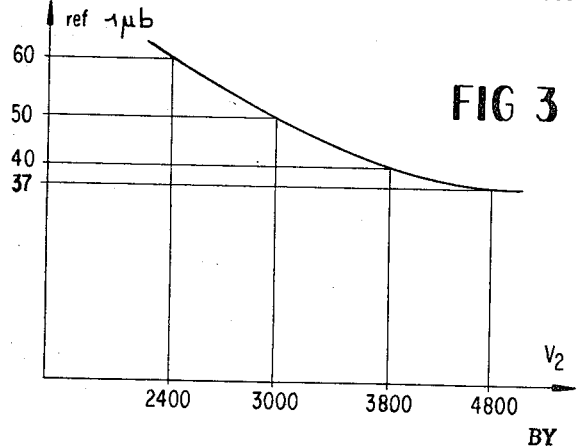
FIG. 3 shows the curve of acoustic attenuation obtained through calculation for different speeds of propagation.

FIG. 3 shows the theoretical curve of acoustic attenuation as a function of the speed of propagation $V_2$, said curve being obtained by calculating the system of equations governing acoustic propagation with the same parameters as precedingly, to wit: the transmission frequency, depth of water and distance between the transmitter and receiver, while the properties of the sea bed surface were as follows: specific weight: 2 and transverse wave speed=$V_2/2$. Calculation has allowed checking theoretically the anomaly AB by resorting to speeds $V_2$ defined by seismic shooting in the vicinity of AB (respectively 2,400 m./sec. and 4,000 m./sec.). Said checking is however of an easy execution only in simple cases.

It is interesting to record together with the acoustic signals received by the receiver the distance between said receiver and the sea bed, so as to allow executing the desired corrections if said distance instead of remaining constant has varied during the recording procedure.

Various records for a same travel path may be executed with different frequencies of transmission or simultaneously at varying frequencies or again with various distances between the transmitter and receivers. The modification of one of said parameters allows removing doubts by means of several records, when signals appear the interpretation of which on a single record is difficult.

The distance above the sea bed at which the receiver or receivers are to be held is selected in accordance with the water depth above the bottom surface to be investigated and the influence of the modifications in depth when they are important should be compensated by a modification in the distance between the receiver and sea bed.

The transmitting and receiving arrangements used for the execution of our improved method are irrelevant as far as the invention is concerned and may be of any desired known type.

Of course, the invention is by no means limited to the particular embodiments disclosed by way of example and various modifications may be brought thereto, without widening the scope of the accompanying claims.

What we claim is:

1. An acoustic method for prospecting the surface of the sea bed consisting in producing low frequency continuous acoustic waves at a first point within the water above said bed, receiving the waves at a second point lying within the water above said bed at a predetermined constant distance above said bed and at a predetermined constant distance from said first point and recording and measuring continuously the attenuation of the signals received to define therethrough data relating to the nature of the sea bed.

2. An acoustic method for prospecting the surface of the sea bed, consisting in producing continuously within a very narrow range of amplitudes low frequency acoustic waves at a first point within the water above said bed, receiving the waves at a second point lying within the water above said bed at a predetermined constant distance above said bed and at a predetermined constant distance from said first point and recording and measuring continuously the attenuation of the signals received to define therethrough data relating to the nature of the sea bed.

3. An acoustic method for prospecting the surface of the sea bed consisting in producing low frequency continuous acoustic waves at a first point within the water above said bed, the range of frequencies of said waves extending between about 0.1 and 1,000 cycles receiving the waves at a second point lying within the water above said bed at a predetermined constant distance above said bed and at a predetermined constant distance from said first point and recording and measuring continuously the attenuation of the signals received to define therethrough data relating to the nature of the sea bed.

4. An acoustic method for prospecting the surface of the sea bed consisting in producing low frequency continuous acoustic waves at a first point within the water above said bed, the range of frequencies of said waves extending between 5 and 30 cycles, receiving the waves at a second point lying within the water above said bed at a predetermined constant distance above said bed and at a predetermined constant distance from said first point and recording and measuring continuously the attenuation of the signals received to define therethrough data relating to the nature of the sea bed.

5. An acoustic method for prospecting the surface of the sea bed consisting in producing low frequency continuous acoustic waves at a first point within the water above said bed, receiving the waves at a second point lying within the water above said bed at a predetermined constant distance above said bed and at a predetermined constant distance from said first point and recording and measuring continuously the attenuation of the signals received to define therethrough the attenuation of the acoustic signals in the transmission and therethrough data relating to the nature of the sea bed.

6. An acoustic method for prospecting the surface of the sea bed, consisting in producing low frequency continuous acoustic waves at a first point within the water at a substantially constant height above said bed, receiving the waves at a second point lying within the water above said bed at a predetermined constant distance above said bed and a predetermined constant distance from said first point and recording and measuring continuously the attenuation of the signals received to define therethrough data relating to the nature of the sea bed.

7. An acoustic method for prospecting the surface of the sea bed consisting in producing low frequency continuous acoustic waves at a first point within the water above said bed, the frequency of said waves being variable, receiving the waves at a second point lying within the water above said bed at a predetermined constant distance above said bed and at a predetermined constant distance from said first point and recording and measuring continuously the attenuation of the signals received to define therethrough data relating to the nature of the sea bed.

8. An acoustic method for prospecting the surface of the sea bed consisting in producing low frequency continuous acoustic waves at a first point within the water above said bed, the frequency of said waves being constant, receiving the waves at a second point lying within the water above said bed at a predetermined constant distance above said bed and at a predetermined constant distance from said first point and recording and measuring continuously the attenuation of the signals received to define therethrough data relating to the nature of the sea bed.

9. An acoustic method for prospecting the surface of the sea bed consisting in producing low frequency continuous acoustic waves at a first point within the water above said bed, receiving the waves at various points lying within the water above said bed at predetermined constant distances above said bed and at various predetermined constant distances from said first point and recording and measuring continuously the attenuation of the signals received to define therethrough data relating to the sea bed nature.

10. An acoustic method for prospecting the surface of the sea bed, consisting in producing low frequency continuous acoustic waves at a first point within the water above said bed, receiving the waves at a second point lying within the water above said bed at a predetermined constant distance above said bed and at a predetermined constant distance from said first point, moving simultaneously the two points along a predetermined path in the water, and recording and measuring continuously the attenuation of the signals received to define therethrough data relating to the nature of the sea bed and simultaneously recording the location of one of said points.

11. An acoustic method for prospecting the surface of the sea bed consisting in producing low frequency continuous acoustic waves at a first point within the water above said bed, receiving the waves at a second point lying within the water above said bed at a predetermined unvarying distance above said bed and at a predetermined constant distance from said first point and recording and measuring continuously the attenuation of the signals received to define therethrough data relating to the nature of the sea bed.

12. An acoustic method for prospecting the surface of the sea bed, consisting in producing low frequency continuous acoustic waves at a first point within the water above said bed, receiving the waves at a second point lying within the water above said bed at a predetermined constant distance above said bed and at a predetermined constant distance from said first point, recording the distance between the second point and the sea bed and recording and measuring continuously the attenuation of the signals received to define therethrough data relating to the nature of the sea bed.

13. An acoustic method for prospecting the surface of the sea bed, consisting in producing low frequency continuous acoustic waves at a first point within the water above said bed, receiving the waves at a second point lying within the water above said bed at a predetermined constant distance above said bed and at a predetermined constant distance from said first point, adjusting the height of the second point above the sea bed in conformity with the modifications in the sea depth, recording the distances between the second point and the sea bed and recording and measuring continuously the attenuation of the signals received to define therethrough data relating to the nature of the sea bed.

14. An arrangement for acoustically prospecting the surface of the sea bed comprising a ship, a transmitter of low frequency continuous acoustic waves immersed in the sea, a float carrying said transmitter and drawn along by the ship, means on board the ship controlling the transmitter, at least one receiver immersed at a distance, a plunger secured to the receiver and adapted to maintain said receiver at a predetermined substantially constant distance above the sea bed, a further float carrying the plunger and receiver and also drawn along by the ship at a substantially constant distance from said transmitter, and means carried by the ship and adapted to record the attenuation of the waves between the transmitter and receiver to thereby supply data relating to the nature of the sea bed.

References Cited
UNITED STATES PATENTS

| | | | |
|---|---|---|---|
| 2,632,150 | 3/1953 | Silverman et al. | 181—0.5 |
| 2,729,300 | 1/1956 | Paslay et al. | 181—0.5 |
| 2,853,824 | 9/1958 | Schutz et al. | 43—17.1 |
| 2,866,512 | 12/1958 | Padberg | 340—7 |
| 3,022,852 | 2/1962 | Pavey | 181—0.5 |
| 3,056,104 | 4/1962 | De Kanski et al. | 181—0.5 |
| 3,181,644 | 5/1965 | Roever | 181—0.5 |

BENJAMIN A. BORCHELT, *Primary Examiner.*

W. KUJAWA, *Assistant Examiner.*